(12) United States Patent
Lai et al.

(10) Patent No.: US 12,130,416 B2
(45) Date of Patent: Oct. 29, 2024

(54) OBSERVATION CARRIER FOR MICROSCOPE AND METHOD OF USING THE SAME

(71) Applicant: FlowVIEW Tek, Taipei (TW)

(72) Inventors: Liang-Hsun Lai, Taipei (TW); Hsin-Hung Lee, Taipei (TW)

(73) Assignee: FlowVIEW Tek, Taipei (TW)

( * ) Notice: Subject to any disclaimer, the term of this patent is extended or adjusted under 35 U.S.C. 154(b) by 190 days.

(21) Appl. No.: 17/522,913

(22) Filed: Nov. 10, 2021

(65) Prior Publication Data

US 2022/0146807 A1      May 12, 2022

Related U.S. Application Data

(60) Provisional application No. 63/113,173, filed on Nov. 12, 2020.

(30) Foreign Application Priority Data

Jun. 23, 2021    (TW) .................................. 110122955

(51) Int. Cl.
    *G02B 21/26*    (2006.01)
    *G02B 27/00*    (2006.01)

(52) U.S. Cl.
    CPC ......... *G02B 21/26* (2013.01); *G02B 27/0006* (2013.01)

(58) Field of Classification Search
    CPC .... G02B 21/26; G02B 27/0006; G02B 21/34; G01N 1/28; H01J 37/20; H01J 37/261
    USPC ....................................................... 359/394
    See application file for complete search history.

(56) References Cited

U.S. PATENT DOCUMENTS

| 4,108,109 | A | 8/1978 | Barger et al. |
| 6,808,633 | B1 * | 10/2004 | Okano ................. B01L 3/5021 436/178 |
| 8,685,325 | B2 | 4/2014 | Wang et al. |
| 2009/0275213 | A1 | 11/2009 | Gotou et al. |

(Continued)

FOREIGN PATENT DOCUMENTS

| AU | 2018202985 | 5/2018 |
| CN | 102209595 | 8/2015 |
| CN | 111540697 | 8/2020 |

(Continued)

OTHER PUBLICATIONS

Examiner provided machine translation of Hideaki et al. JP 2017201289 (Year: 2017).*

(Continued)

*Primary Examiner* — Tuyen Tra
*Assistant Examiner* — Rahman Abdur
(74) *Attorney, Agent, or Firm* — JCIP GLOBAL INC.

(57) ABSTRACT

An observation carrier for a microscope is provided. The observation carrier includes a rotation base and a driving unit. The rotation base is adapted to carry a base material, the base material is adapted to receive a droplet, and the droplet includes a sample liquid and at least one sample particle suspended in the sample liquid. The driving unit is connected to the rotation base and is adapted to drive the rotation base to rotate, such that the sample liquid on the base material is removed by a centrifugal force produced by the rotation of the rotation base. In addition, a method of using the observation carrier for a microscope is also provided.

10 Claims, 5 Drawing Sheets

(56) References Cited

U.S. PATENT DOCUMENTS

2019/0157037 A1* 5/2019 Tomimatsu ........ G02B 27/0955

FOREIGN PATENT DOCUMENTS

| | | |
|---|---|---|
| JP | H04206541 | 7/1992 |
| JP | H0743278 | 2/1995 |
| JP | 2020153960 | 9/2020 |
| TW | I463011 | 12/2014 |

OTHER PUBLICATIONS

Fukuzono et al. WO 0078464; Centrifugal Separator for Sample Preparation Devices (Year: 2000); (Examiner provided machine translation).*
JP 4752546 Centrifuge Device and Centrifuge Method (Year: 2011), (Examiner provided machine translation).*
Tagashira, JP 2007232674; Centrifugal Separation Device and Centrifugal Separation Method (Year: 2007); (Examiner provided machine translation).*
"Office Action of China Counterpart Application", issued on Mar. 21, 2024, p. 1-p. 9.

* cited by examiner

OBSERVATION CARRIER FOR MICROSCOPE AND METHOD OF USING THE SAME

CROSS-REFERENCE TO RELATED APPLICATION

This application claims the priority benefit of U.S. Provisional Application No. 63/113,173, filed on Nov. 12, 2020 and Taiwan Application No. 110122955, filed on Jun. 23, 2021. The entirety of each of the above-mentioned patent applications is hereby incorporated by reference herein and made a part of this specification.

BACKGROUND

Technical Field

The invention relates to an observation carrier, and particularly relates to an observation carrier for a microscope and a method of using the same.

Description of Related Art

A common electron microscope observation method is to first drop a sample liquid containing sample particles on a clean surface by using a dropper or other means, and then cover a base material on the sample liquid so that the sample particles are adsorbed on a surface of the base material. Then, after the sample liquid on the surface of the base material is wiped dry, the residue on the surface of the base material is washed with clean water and the clean water on the base material is wiped dry, so that the sample particles on the base material may be observed through an electron microscope.

However, in the above method, when the base material is covered on the sample liquid, a surface tension of the sample liquid causes the base material to slide and affects its adsorption to the sample particles, and the contact with the surface of the base material when the surface of the base material is wiped dry may also affect its adsorption to the sample particles. In addition, the above method cannot ensure that the sample liquid on the surface of the base material is completely wiped dry, which may cause cross-contamination in the subsequent cleaning process with clean water, and the above method requires the use of a clamp to clamp the base material by multiple times, which may also cause cross-contamination.

SUMMARY

The invention is directed to an observation carrier for a microscope and a method of using the same, which ensure that sample particles are indeed adsorbed on a surface of a base material, and reduce a probability of cross-contamination on the surface of the base material.

The invention provides an observation carrier for a microscope, which includes a rotation base and a driving unit. The rotation base is adapted to carry a base material, the base material is adapted to receive a droplet, and the droplet includes a sample liquid and at least one sample particle suspended in the sample liquid. The driving unit is connected to the rotation base and is adapted to drive the rotation base to rotate, such that the sample liquid on the base material is removed by a centrifugal force produced by the rotation of the rotation base.

In an embodiment of the invention, the base material is adapted to adsorb the at least one sample particle.

In an embodiment of the invention, the base material carries one of a positive charge and a negative charge, and the at least one sample particle carries other one of the positive charge and the negative charge.

In an embodiment of the invention, the rotation base has a carrying surface and is adapted to carry the base material by the carrying surface, and the driving unit is adapted to drive the rotation base to rotate along a rotation axis, and the rotation axis is perpendicular to the carrying surface.

In an embodiment of the invention, the base material adsorbing the at least one sample particle is adapted to receive a cleaning liquid, and the driving unit is adapted to drive the rotation base to rotate, such that the cleaning liquid on the base material is removed by the centrifugal force produced by the rotation of the rotation base.

The invention provides a method of using an observation carrier for a microscope, the observation carrier for a microscope includes a rotation base and a driving unit, and the method includes following steps. A base material is carried by the rotation base, and a droplet is received by the base material, wherein the droplet includes a sample liquid and at least one sample particle suspended in the sample liquid. The rotation base is driven to rotate by the driving unit, such that the sample liquid on the base material is removed by a centrifugal force produced by the rotation of the rotation base.

In an embodiment of the invention, the method includes adsorbing the at least one sample particle by the base material.

In an embodiment of the invention, the base material carries one of a positive charge and a negative charge, and the at least one sample particle carries other one of the positive charge and the negative charge.

In an embodiment of the invention, the rotation base has a carrying surface and is adapted to carry the base material by the carrying surface, and the driving unit is adapted to drive the rotation base to rotate along a rotation axis, and the rotation axis is perpendicular to the carrying surface.

In an embodiment of the invention, the method includes following steps. A cleaning liquid is received by the base material adsorbing the at least one sample particle. The rotation base is driven to rotate by and the driving unit, such that the cleaning liquid on the base material is removed by the centrifugal force produced by the rotation of the rotation base.

Based on the above description, the invention uses a driving unit to drive the rotation base to rotate to generate a centrifugal force, so that the sample liquid and/or the cleaning liquid on the base material except for the sample particles may be quickly and completely removed. Accordingly, there is no need to remove the sample liquid and/or the cleaning liquid by wiping, and the influence on adsorption of the sample particles by the base material due to the contact with the base material during the wiping process is avoided. In addition, since the sample liquid and/or the cleaning liquid may be completely removed by the centrifugal force as described above, and this method may greatly reduce a number of times that the base material is clamped with a clamp, the probability of cross-contamination on the surface of the base material may be reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
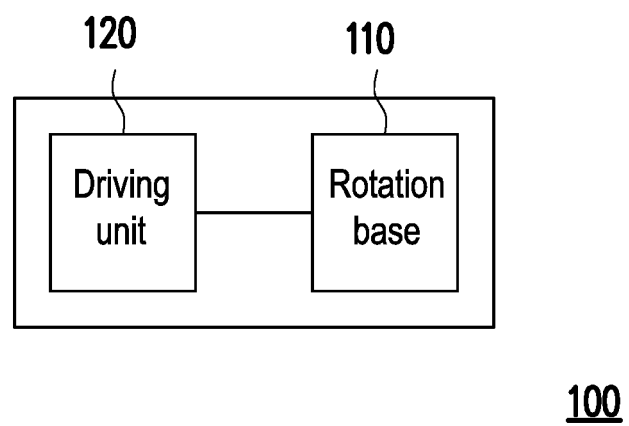
FIG. 1 is a block diagram of an observation carrier for a microscope according to an embodiment of the invention.
Figure 2A:
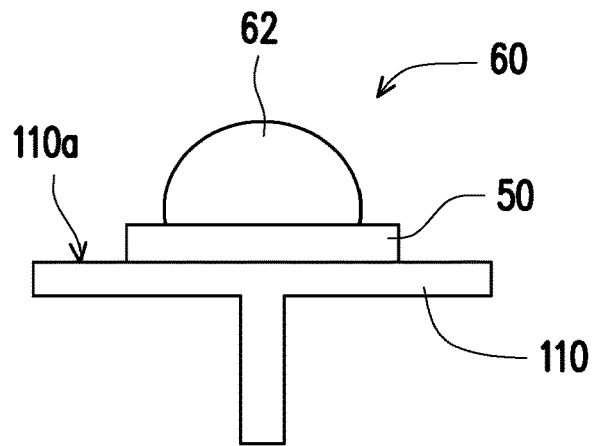
FIG. 2A to FIG. 2F illustrate an operation flow of the observation carrier for a microscope of FIG. 1.

FIG. 1 is a block diagram of an observation carrier for a microscope according to an embodiment of the invention. FIG. 2A to FIG. 2F illustrate an operation flow of the observation carrier for a microscope of FIG. 1. FIG. 3 illustrates adsorption of sample particles in a droplet of FIG. 2A by a base material, which is a schematic partial enlarged view of the base material of FIG. 2A. Referring to FIG. 1, FIG. 2A and FIG. 3, an observation carrier for a microscope 100 of the embodiment includes a rotation base 110 and a driving unit 120. The rotation base 110 is adapted to carry a base material 50 through a carrying surface 110a thereof, and the base material 50 is adapted to receive a droplet 60, where the droplet 60 includes a sample liquid 62 (indicated in FIG. 2) and at least one sample particle 64 (indicated in FIG. 3) suspended in the sample liquid 62. As shown in FIG. 3, the base material 50, for example, carries positive charges, the sample particles 64, for example, carry negative charges, so that the base material 50 may adsorb the sample particles 64.

Figure 2B:
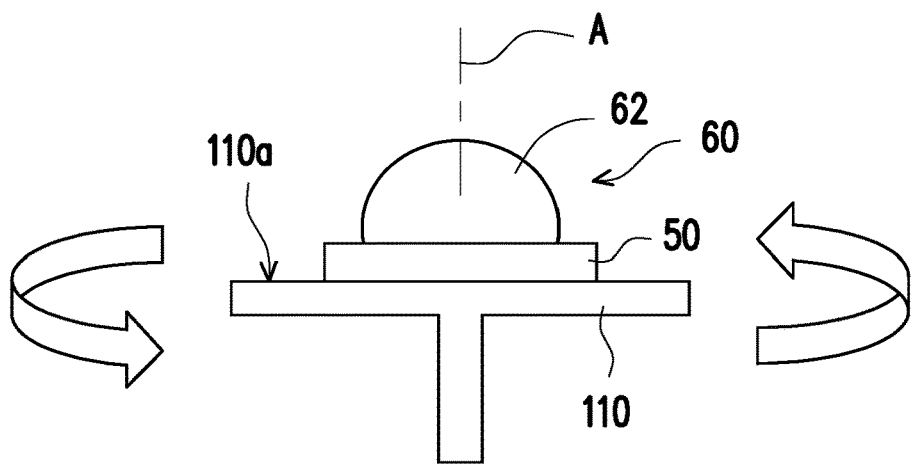
Figure 2C:
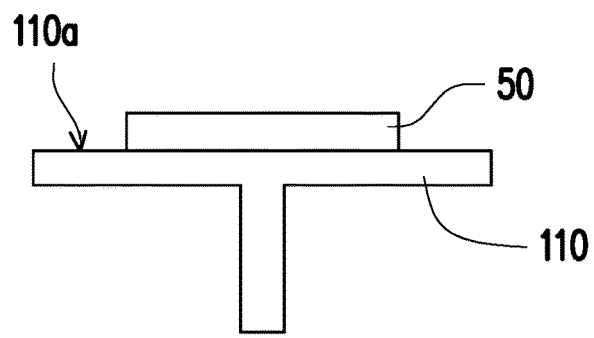
Figure 2D:
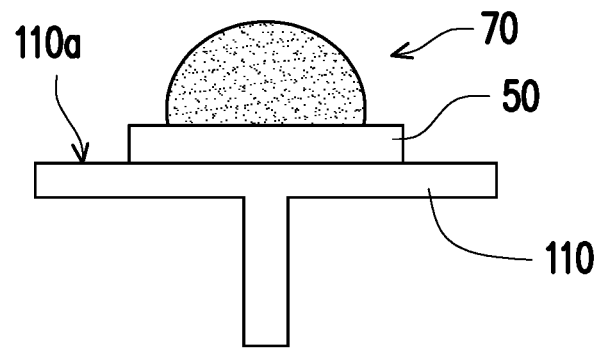
Figure 2E:
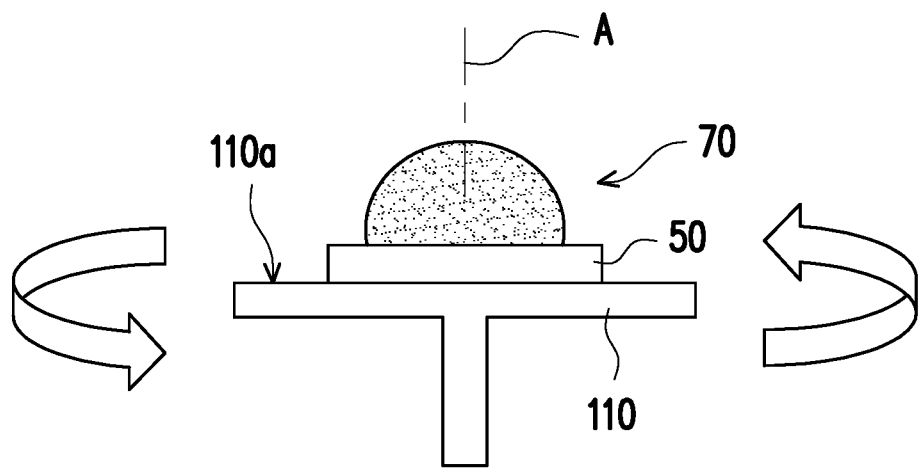

The driving unit 120 (shown in FIG. 1) is connected to the rotation base 110 and is adapted to drive the rotation base 110 to rotate along a rotation axis A perpendicular to the carrying surface 110a as shown in FIG. 2B, such that the sample liquid 62 on the base material 50 is removed by a centrifugal force produced by the rotation of the rotation base 110, so as to achieve a status shown in FIG. 2C. The base material 50 adsorbed with the sample particles 64 (shown in FIG. 3) is adapted to receive a cleaning liquid 70 as shown in FIG. 2D, so as to clean residues (for example, liquid stains remained by the sample liquid 62) on the base material 50 through the cleaning liquid 70. Then, the driving unit 120 (shown in FIG. 1) is adapted to drive the rotation base 110 to rotate along the rotation axis A as shown in FIG. 2E, so that the cleaning liquid 70 on the base material 50 is removed through the centrifugal force produced by the rotation of the rotation base 110 to achieve a status shown in FIG. 2F, and then a microscope may be used to observe the sample particles 64 (shown in FIG. 3) on the base material 50.

As described above, in the embodiment, the driving unit 120 is used to drive the rotation base 110 to rotate to generate the centrifugal force, so that the sample liquid 62 and/or the cleaning liquid 70 on the base material 50 except for the sample particles 64 may be quickly and completely removed. Accordingly, there is no need to remove the sample liquid 62 and/or the cleaning liquid 70 by wiping, and the influence on adsorption of the sample particles by the base material 50 due to the contact with the base material 50 during the wiping process is avoided. In addition, since the sample liquid 60 and/or the cleaning liquid 70 may be completely removed by the centrifugal force as described above, and this method may greatly reduce a number of times that the base material 50 is clamped with a clamp, the probability of cross-contamination on the surface of the base material 50 may be reduced.

Figure 2F:
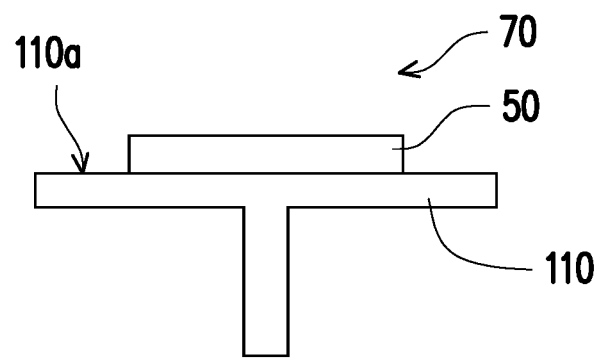
Figure 3:
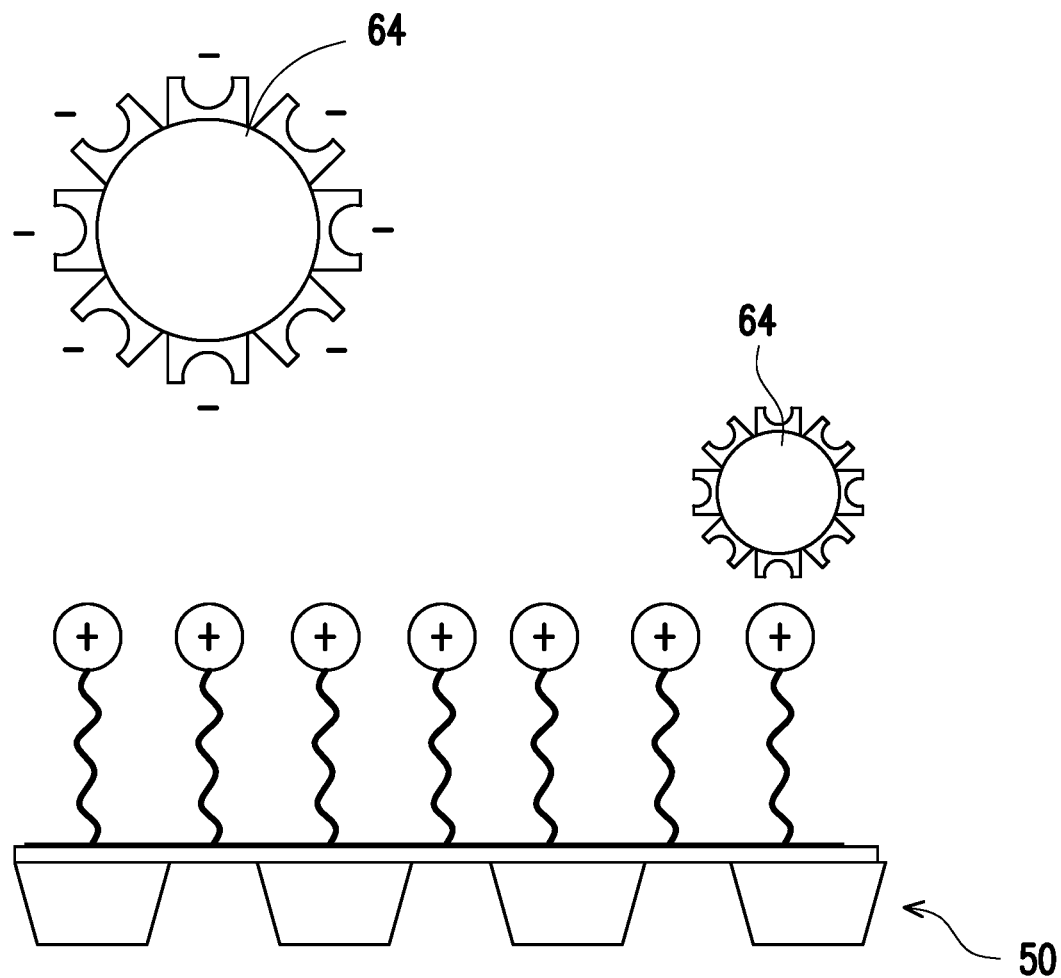
FIG. 3 illustrates adsorption of sample particles in a droplet of FIG. 2A by a base material.

In other embodiments, if the rotation step shown in FIG. 2B may completely remove the sample liquid 62 on the base material 50 to only remain the sample particles 64 on the surface of the base material 50, the steps of washing with clean water and removing the clean water in FIG. 2D to FIG. 2F may be omitted, which is not limited by the invention, and the above situation will be specifically explained below.

Figure 4:
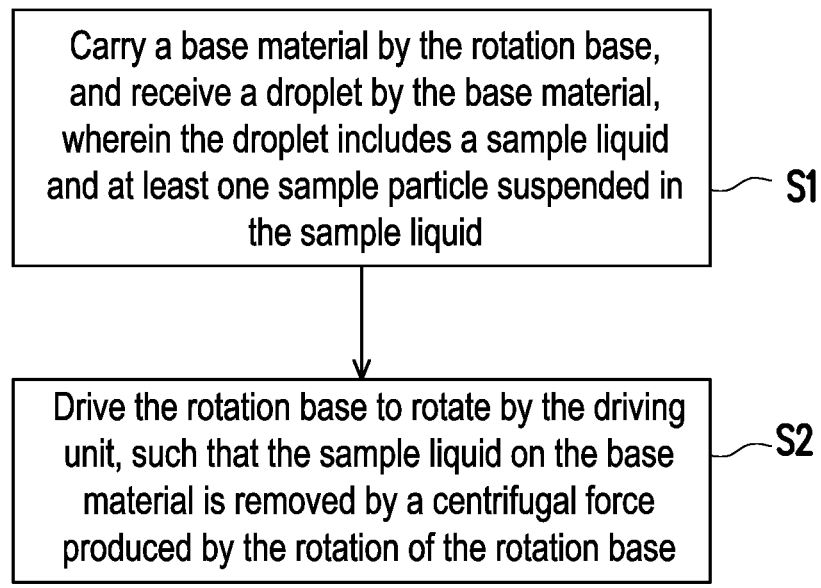
FIG. 4 is a flowchart of a method of using an observation carrier for a microscope according to an embodiment of the invention.

FIG. 4 is a flowchart of a method of using an observation carrier for a microscope according to an embodiment of the invention. Referring to FIG. 4, first, the base material 50 is carried by the rotation base 110, and the droplet 60 is received by the base material 50, where the droplet 60 includes the sample liquid 62 and the sample particles 64 suspended in the sample liquid 62 (step S1). The rotation base 110 is driven to rotate by the driving unit 120, such that the sample liquid 62 on the base material 50 is removed by a centrifugal force produced by the rotation of the rotation base 110 (step S2).

If the sample liquid 62 on the base material 50 has been completely removed in the above step S2, a microscope may be used to observe the sample particles 64 on the base material 50. Conversely, if the sample liquid 62 on the base material 50 has not been completely removed in the above step S2, the subsequent steps may be performed. Namely, the base material 50 adsorbing the sample particles 64 receives the cleaning liquid 70, and the driving unit 120 drives the rotation base 110 to rotate, such that the cleaning liquid 70 on the base material 50 is removed by the centrifugal force produced by the rotation of the rotation base 110, and then the microscope is used to observe the sample particles 64 on the base material 50.

In summary, the invention uses a driving unit to drive the rotation base to rotate to generate a centrifugal force, so that the sample liquid and/or the cleaning liquid on the base material except for the sample particles may be quickly and completely removed. Accordingly, there is no need to remove the sample liquid and/or the cleaning liquid by wiping, and the influence on adsorption of the sample particles by the base material due to the contact with the base material during the wiping process is avoided. In addition, since the sample liquid and/or the cleaning liquid may be completely removed by the centrifugal force as described above, and this method may greatly reduce a number of times that the base material is clamped with a clamp, the probability of cross-contamination on the surface of the base material may be reduced.

What is claimed is:

1. An observation carrier for a microscope, comprising:
   a rotation base, adapted to carry a base material, wherein the base material is adapted to receive a droplet, and the droplet comprises a sample liquid and at least one sample particle suspended in the sample liquid; and
   a driving unit, connected to the rotation base and adapted to drive the rotation base to rotate, such that the sample liquid on the base material is removed, and the remove of the sample liquid is completely performed by a centrifugal force produced by the rotation of the rotation base.

2. The observation carrier for a microscope as claimed in claim 1, wherein the base material is adapted to adsorb the at least one sample particle.

3. The observation carrier for a microscope as claimed in claim 1, wherein the base material carries one of a positive charge and a negative charge, and the at least one sample particle carries other one of the positive charge and the negative charge.

4. The observation carrier for a microscope as claimed in claim 1, wherein the rotation base has a carrying surface and is adapted to carry the base material by the carrying surface, the driving unit is adapted to drive the rotation base to rotate along a rotation axis, and the rotation axis is perpendicular to the carrying surface.

5. The observation carrier for a microscope as claimed in claim 1, wherein the base material adsorbing the at least one sample particle is adapted to receive a cleaning liquid, and the driving unit is adapted to drive the rotation base to rotate, such that the cleaning liquid on the base material is removed by the centrifugal force produced by the rotation of the rotation base.

6. A method of using an observation carrier for a microscope, wherein the observation carrier for a microscope comprises a rotation base and a driving unit, the using method comprising:
   carrying a base material by the rotation base, and receiving a droplet by the base material, wherein the droplet comprises a sample liquid and at least one sample particle suspended in the sample liquid; and
   driving the rotation base to rotate by the driving unit, such that the sample liquid on the base material is removed, and the remove of the sample liquid is completely performed by a centrifugal force produced by the rotation of the rotation base.

7. The method of using the observation carrier for a microscope as claimed in claim 6, further comprising: adsorbing the at least one sample particle by the base material.

8. The method of using the observation carrier for a microscope as claimed in claim 6, wherein the base material carries one of a charge positive and a negative charge, and the at least one sample particle carries other one of the positive charge and the negative charge.

9. The method of using the observation carrier for a microscope as claimed in claim 6, wherein the rotation base has a carrying surface and is adapted to carry the base material by the carrying surface, the driving unit is adapted to drive the rotation base to rotate along a rotation axis, and the rotation axis is perpendicular to the carrying surface.

10. The method of using the observation carrier for a microscope as claimed in claim 6, further comprising:
   receiving a cleaning liquid by the base material adsorbing the at least one sample particle; and
   driving the rotation base to rotate by the driving unit, such that the cleaning liquid on the base material is removed by the centrifugal force produced by the rotation of the rotation base.

* * * * *